United States Patent [19]
Thun

[11] 3,906,811
[45] Sept. 23, 1975

[54] VELOCIPEDE TREAD CRANK

[76] Inventor: Alfred Thun, Neuenloher Weg 14, D-5828 Ennepetal-Voerde, Germany

[22] Filed: Apr. 29, 1974

[21] Appl. No.: 465,363

[30] Foreign Application Priority Data
Nov. 9, 1973 Germany............................ 2359437

[52] U.S. Cl.............................. 74/594.1; 74/594.2
[51] Int. Cl.² ........................................ B62M 3/00
[58] Field of Search ......... 74/594.1, 594.2; 301/2.5; 308/23.5, 179.5

[56] References Cited
UNITED STATES PATENTS

| | | | |
|---|---|---|---|
| 622,644 | 4/1899 | Annable | 74/594.1 |
| 623,373 | 4/1899 | Jerome | 74/594.1 |
| 648,077 | 4/1900 | Ludlow | 74/594.2 X |
| 670,519 | 3/1901 | Scovill | 74/594.2 |

*Primary Examiner*—Samuel Scott
*Assistant Examiner*—F. D. Shoemaker
*Attorney, Agent, or Firm*—Spencer & Kaye

[57] ABSTRACT

A velocipede tread crank has a crank shaft and a crank arm at either shaft end; the crank shaft and one crank arm are formed as a one-piece, light metal cast component and the other crank arm, which is also a light metal cast member, is releasably attached to the crank shaft. The crank shaft has a smallest outer diameter of from 20 mm to 25 mm.

5 Claims, 3 Drawing Figures

US Patent    Sept. 23, 1975    3,906,811
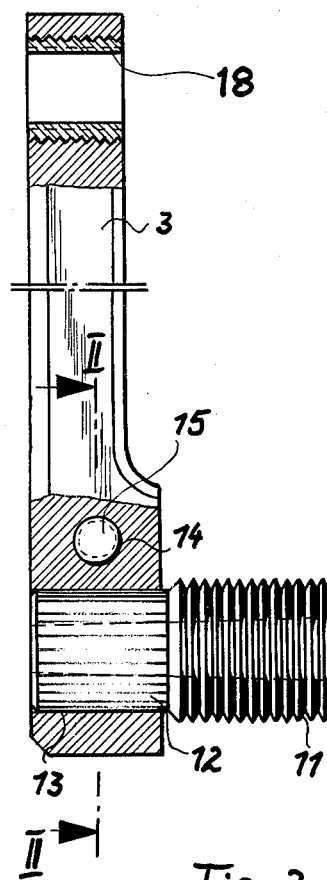
Fig. 1
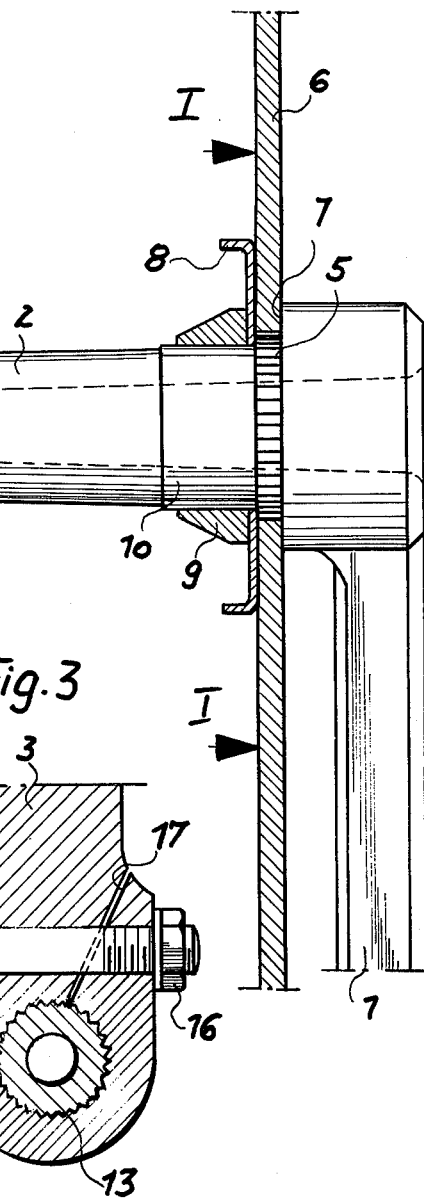
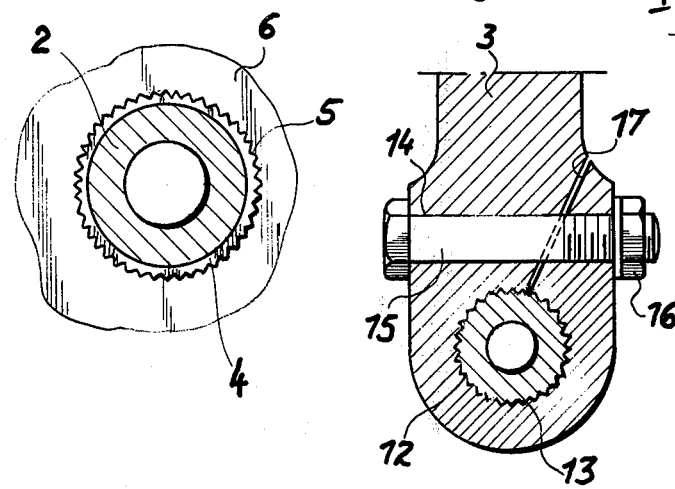
Fig. 2    Fig. 3

VELOCIPEDE TREAD CRANK

BACKGROUND OF THE INVENTION

This invention relates to a velocipede tread crank of the type that is made of a light metal, for example, an aluminum alloy mainly for the purpose of reducing the overall weight of a velocipede, particularly a bicycle.

It has been known to forge tread crank arms of light metal and to releasably secure them to a steel crank shaft. The steel shaft is machined at both end portions to obtain a tapered part of rectangular cross section each terminating in a threaded stud. The crank arms are inserted on the tapered parts by virtue of openings which are provided in the crank arms and which conform to the polygonal shape of the tapered shaft portions. Each threaded stud receives a securing nut which is tightened against the outer face of the crank arm and which thus prevents the crank arm from being removed from the crank shaft.

One of the crank arms carries a flange to which the chain sprocket is tightened. The torque applied by the bicycle rider to the crank shaft by pedalling is transmitted to the driven bicycle wheel through the sprocket chain.

The manufacture of crank arms by drop forging and by means of a series of necessary, relatively complicated machining operations to obtain the finished shape of the crank arms and the crank shaft is relatively expensive.

SUMMARY OF THE INVENTION

It is an object of the invention to provide an improved light-metal tread crank for a velocipede to simplify and render more economical its manufacture and to further reduce its weight.

These objects and others to become apparent as the specification progresses are accomplished by the invention, according to which, briefly stated, the velocipede tread crank has a crank shaft and a crank arm at either shaft end; the crank shaft and one crank arm are formed as a one-piece, light metal cast component and the other crank arm, which is also a light metal cast member, is releasably attached to the crank shaft. The crank shaft has a smallest outer diameter of from 20 mm to 25 mm.

A tread crank of the afore-outlined structure is more simple and more economical to manufacture than it has been possible heretofore. Further, the tread crank according to the invention has a weight which is reduced to an extent that could not be accomplished before. The tread crank designed according to the invention is nevertheless capable of transmitting a torque of the same magnitude as prior art structures of heavier construction.

The crank according to the invention is particularly adapted to be installed in a tread crank housing which has conventionally served as a bearing for the so-called "Fauber" tread cranks in which the crank shaft and both crank arms together form a one-piece member. The tread crank according to the invention may be mounted in a manner which is subtantially simpler than the installation of the "Fauber" cranks.

For the purpose of further decreasing the weight without significantly limiting the torque resistance of the crank shaft, the latter is, according to the invention, designed as a hollow shaft.

BRIEF DESCRIPTION OF THE DRAWINGS

FIG. 1 is a front elevational view, partially in section, of a preferred embodiment of the invention.

FIG. 2 is a sectional view taken along the line I—I of FIG. 1.

FIG. 3 is a sectional view taken along line II—II of FIG. 1.

DESCRIPTION OF THE PREFERRED EMBODIMENTS

Turning now to FIG. 1, the velocipede tread crank shown therein essentially comprises a crank shaft 2 carrying, at both ends, crank arms 1 and 3, respectively. The crank arm 1 and the crank shaft 2 form a one-piece cast component made of a light metal, for example, an aluminum alloy. The second crank arm 3 which is also a cast light metal component, is detachably mounted to the crank shaft 2 in a manner to be described later.

The shaft 2 is axially hollow and has an outer diameter which is approximately 25% greater than those made of steel. Its smallest outer diameter is between 20 mm and 25 mm. Thus, despite the smaller strength per area unit of the light metal with respect to that of steel, the crank shaft 2 has approximately the same torque resistance as a steel shaft.

That end of the crank shaft 2 which is adjacent to the integral crank arm 1 carries a collar 4 which has a greater diameter than that of the crank shaft 2 and which is provided with serrations 5 along its peripheral edge. To the collar 4 there is press-fitted a chain sprocket 6 which, for this purpose, is provided with a conforming central opening. The chain sprocket 6 is abutted by a radial shoulder 7 of the crank arm 1. The large-diameter collar 4 makes possible to permanently secure thereto the chain sprocket 6 without the danger of generating an excessive surface stress on the form locking (force transmitting) connecting means between the crank shaft 2 and the chain sprocket 6 even if the latter is made of a light metal. It is noted that the collar 4, instead of a serrated, circular configuration, as shown in FIG. 2, may have a noncircular (e.g., polygonal) shape cooperating in a form locking manner with a conforming opening in the chain sprocket 6 for preventing a relative angular displacement between the crank shaft 2 and the sprocket 6.

That radial face of the chain sprocket 6 which is oriented away from the crank arm 1 is in engagement with a dust cover 8. The latter is mounted on the crank shaft 2 and closes the radial opening of the crank shaft housing, not shown. To the crank shaft 2 there is further secured with a press fit a bearing ring 9 presenting a running surface for a roller bearing, not shown. The ring 9 is made of steel and abuts, in the direction of insertion, the dust cover 8. The crank shaft zone 10 which carries the dust cover 8 and the ring 9, has a diameter slightly greater than other portions of the crank shaft 2, so that the dust cover 8 and the ring 9 may be slid along the crank shaft 2 without resistance up to the zone 10. In the vicinity of its free end remote from the crank arm 1, the crank shaft 2 has a portion which is provided with an externally threaded zone 11 on which there is mounted and threadedly engaged a second bearing ring (not shown) arranged symmetrically with the bearing ring 9.

The crank shaft 2 terminates, at its end remote from the crank arm 1, in a serrated stub 12 to which there is removably attached the second crank arm 3. For this purpose, the latter is provided with a bore 13 that fits over the stub 12. The crank arm 3 is further provided with a throughgoing bore 14 which extends in the vicinity of the bore 13 and has an axis which is approximately normal to the axis of the crank shaft 2 and the longitudinal axis of the crank arm 3. As it may be best observed in FIG. 3, the bore 14 accommodates a tensioning bolt 15 carrying at its threaded end a nut 16. The portion of the crank arm 3 in which the bores 13 and 14 extend, is further provided with an oblique slot 17 for permitting this crank arm portion to be tightened (clamped) about the stub 12 by means of the bolt and screw assembly 15, 16. The slot 17 extends from the bore 13 transversely through the bore 14 to the outer surface of the crank arm 3. The thus tightenable end portion of the crank arm 3 provides that any fatigue of material of the releasable connection between the crank shaft 2 and the crank arm 3 are compensated at all times.

Each crank arm 1 and 3 has, at its respective free end remote from the crank shaft 2, an eyelet in which there is inserted a threaded steel bushing 18 for receiving the threaded end of a pedal shaft, not shown.

The steel components may be protected from corrosion by providing them with a chrome or zinc coating.

It will be understood that the above description of the present invention is susceptible to various modifications, changes and adaptions, and the same are intended to be comprehended within the meaning and range of equivalents of the appended claims.

I claim:

1. A velocipede tread crank, comprising in combination:
   a. a light metal cast crank shaft having a smallest outer diameter from 20 mm to 25 mm; said crank shaft having a first end and a second end;
   b. a first light metal cast crank arm carried at said first end of said crank shaft and forming therewith an integral, one-piece component;
   c. a second light metal cast crank arm having an end portion including means defining a bore, said second end of said crank shaft being received in said bore, said bore and said second end of said crank shaft forming connecting means for releasably attaching said second crank arm to said crank shaft remote from said first crank arm; and
   d. tightening means forming part of said connecting means for clamping said second crank arm to said crank shaft.

2. A velocipede tread crank as defined in claim 1, wherein said crank shaft is axially hollow.

3. A velocipede tread crank as defined in claim 1, further comprising
   e. a chain sprocket attached to said crank shaft immediately adjacent said first crank arm; and
   f. means defining an annular shoulder on said first crank arm at its end connected to said crank shaft; said annular shoulder being in engagement with said chain sprocket and constituting an axial abutment therefor.

4. A velocipede tread crank as defined in claim 1, wherein said second end of said crank shaft is formed as a serrated stud, said tightening means includes
   a. means defining an additional bore in said end portion of said second crank arm, said additional bore extending spaced from the crank shaft receiving bore and substantially normal to the longitudinal axis of the crank shaft;
   b. a tightening screw means passing through said additional bore; and
   c. means defining a slot extending from said crank shaft receiving bore through said additional bore to an external surface of said end portion of said second crank arm.

5. A velocipede tread crank, comprising in combination:
   a. a light metal cast crank shaft having a smallest outer diameter from 20 mm and to 25 mm;
   b. a first light metal cast crank arm carried at one end of said crank shaft and forming therewith an integral, one-piece component;
   c. a second light metal cast crank arm carried at an end of said crank shaft remote from said first crank arm;
   d. connecting means for releasably attaching said second crank arm to said crank shaft;
   e. a collar integral with said crank shaft and having serrations on its circumference, said collar being disposed on said crank shaft immediately adjacent said first crank arm; and
   f. a chain sprocket including means defining a central opening therein, said chain sprocket being supported on said crank shaft by a press fit between said collar and said opening receiving said collar for preventing relative angular displacement between said chain sprocket and said crank shaft.

* * * * *

UNITED STATES PATENT OFFICE
CERTIFICATE OF CORRECTION

PATENT NO. : 3,906,811

DATED : September 23rd, 1975

INVENTOR(S) : Alfred Thun

It is certified that error appears in the above-identified patent and that said Letters Patent are hereby corrected as shown below:

In the heading of the patent, under [30] Foreign Application Priority Data, change "Nov. 9" to --Nov. 29--.

Signed and Sealed this seventeenth Day of February 1976

[SEAL]

Attest:

RUTH C. MASON
*Attesting Officer*

C. MARSHALL DANN
*Commissioner of Patents and Trademarks*